United States Patent [19]

Treese

[11] Patent Number: 5,045,247
[45] Date of Patent: Sep. 3, 1991

[54] BUBBLE CAP ASSEMBLY

[75] Inventor: Steven A. Treese, Placentia, Calif.

[73] Assignee: Union Oil Company of California, Los Angeles, Calif.

[21] Appl. No.: 502,048

[22] Filed: Mar. 30, 1990

[51] Int. Cl.$^5$ .............................................. B01F 3/04
[52] U.S. Cl. .............................................. 261/114.2
[58] Field of Search ...................... 261/114.2; 411/485, 411/489

[56] References Cited

U.S. PATENT DOCUMENTS

| | | | |
|---|---|---|---|
| 2,391,502 | 12/1945 | O'Brien | 261/114.2 |
| 2,445,083 | 7/1948 | Reed | 261/114.2 |
| 2,580,260 | 12/1951 | Winters | 261/114.2 |
| 2,602,652 | 7/1952 | Haynes | 261/114.2 |
| 2,612,360 | 9/1952 | Haynes et al. | 261/114.2 |
| 2,645,468 | 7/1953 | Sullivan | 261/114.2 |
| 2,653,018 | 9/1953 | Dunn | 261/114.2 |
| 2,710,177 | 6/1955 | Young et al. | 261/114.2 |
| 2,785,882 | 3/1957 | Wansink et al. | 261/114.2 |
| 2,797,907 | 7/1957 | De Bie | 261/114.2 |
| 4,832,557 | 5/1989 | Jacobsen | 411/485 |

Primary Examiner—Tim Miles
Attorney, Agent, or Firm—Clark E. De Larvin; Gregory F. Wirzbicki

[57] ABSTRACT

A bubble cap assembly for attachment over an opening in a deck tray of a gas-liquid contact apparatus. The bubble cap assembly comprises a riser located over an opening providing fluid communication from a lower surface of the deck tray to an upper surface. A bubble cap encompasses an upwardly extending end of the riser and has an opening located in a top portion thereof. A retainer member is disposed within a passageway in the riser. The retainer member has outwardly extending end portions for engaging a lower surface of the deck tray and an upwardly extending shaft portion with a slot adjacent its upper end. A locking means is provided which comprises a wedge for tightly urging the bubble cap, spacer means and riser member against an upper surface of the deck tray and urging the lower outwardly extending end portions of the retainer member against the lower surface of the deck tray.

28 Claims, 1 Drawing Sheet

BUBBLE CAP ASSEMBLY

FIELD OF THE INVENTION

This invention relates to a bubble cap assembly for mounting on a deck tray of a gas or vapor and liquid contact apparatus, such as are used for fractionating, absorbing, scrubbing and like purposes in the chemical and petroleum refining industries.

BACKGROUND DISCUSSION

A typical gas-liquid contact apparatus generally comprises a column or tower containing a plurality of substantially horizontal trays arranged one above the other. In such an apparatus the gas or vapor passes successively through chimneys or tubes from one tray to another of the column or tower, and bubbles through a plurality of pools or streams of liquid on each tray. The gas or vapor is supplied at the bottom of the tower and discharged at the top thereof, and the liquid is supplied at the top and discharged at the bottom of the tower. In some petrochemical applications the respective flows are reversed.

In counterflow operation in which gas is taken off the top and liquid off the bottom, any constituents in the gas which are condensed by contact with the liquid escape with the latter at the bottom of the tower, while any remaining unabsorbed or uncondensed gas is drawn off from the top of the tower.

In such apparatus, it is customary to provide bubble cap assemblies which are mounted in fluid communication with openings provided on each tray of the gas-liquid contact apparatus. For economy of manufacture and standardization of parts, bubble cap assemblies in any one installation are usually of the same size and design. In a conventional installation the number and size of the bubble cap assemblies determines the total passage area for upward flow of gas from the space below a particular tray to the space above it.

After a period of time, the parts forming the bubble cap assembly may become corroded or coke-like deposits may form up on it. When the extent of corrosion or buildup of deposits reduces the efficiency of the contact apparatus below an acceptable limit, the operation of the tower is suspended for cleaning and repairs. Corrosion and deposits on the exposed surfaces of the bubble cap assemblies make it undesirable or impossible to effect any unthreadening of parts for the purpose of disassembly. Further, the arrangement of the parts on the tray is such that one person has access only to one end of the assembly for its installation or removal.

Accordingly, it would be advantageous to have a bubble cap assembly which could be installed by one person from one side of the tray, require no special tools for installation or removal, and would not include any parts that could fall through the opening in the tray from one level to the level below.

SUMMARY OF THE INVENTION

The present invention provides a bubble cap assembly for attachment to a deck tray having an opening therethrough. The present invention is particularly suitable for use in a gas-liquid contact apparatus comprising a housing enclosing a plurality of superimposed deck trays. Each of the deck trays is provided with a plurality of bubble cap assemblies. The present bubble cap assembly comprises a riser located over the opening and having an upwardly extending end and a bubble cap encompassing the upwardly extending end of the riser. An opening is provided in an upper portion of the bubble cap. A spacer means is located intermediate the riser and bubble cap for maintaining the two in a spaced apart relationship with one another. The apparatus further includes a retainer member substantially centrally disposed within a passageway in the riser. The retainer member comprises an outwardly extending lower end portion for engaging a lower surface of the deck tray and an upwardly extending shaft portion extending through the opening in the bubble cap. The retainer member is provided with a slot adjacent its upper end.

A key aspect of the assembly is a locking means which holds the foregoing parts together in a working relationship during normal operation and also provides for easy removal and installation of the bubble cap assembly from a top surface of the deck plate without the necessity of any special tools. The locking means comprises two substantially parallel leg portions joined at one end by a base portion. One of the leg portions and base portions are sized for passage through the slot in the retainer member. The other leg portion is in the form of a ramp to form a wedge means which, when introduced into the slot in the retainer member, tightly urges the bubble cap, spacer and riser means against an upper surface of the deck tray, and urges the lower end portion of the retainer member against the lower surface of the deck tray. Both leg portions and base portion of the locking means are sized for passage through an opening in the bubble cap.

During installation or removal of the bubble cap assembly, the retainer member is suspended through its slot by the base member of the locking means. The locking means is lowered through the opening in the bubble cap, thereby lowering the retainer member a sufficient distance below the riser to permit installation or removal of the bubble cap assembly from the opening in the deck tray. In accordance with a preferred embodiment of the invention, the locking means is further provided with a means for preventing it from falling through the opening in the cap assembly to prevent it and the retainer member from falling through the opening in the deck tray.

The present invention overcomes many of the disadvantages of prior bubble cap assemblies. The present invention is easily installed or removed from a deck tray by a single workman having access to only one side of the deck tray. In addition it requires no special tools and utilizes no threaded fasteners. Still further, the parts are interconnected in such a manner as to ensure that none of them are likely to fall through the deck tray opening during installation or removal of the bubble cap assembly. These and other advantages will be more apparent from the following detailed description.

DESCRIPTION OF A PREFERRED EMBODIMENT

Figure 1:
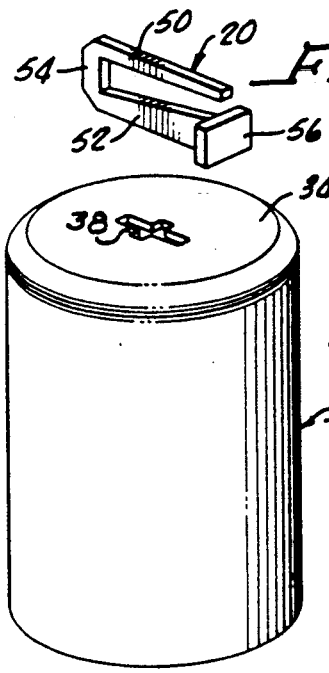
FIG. 1 is an exploded view of a bubble cap assembly constructed in accordance with the present invention.

Referring to FIG. 1 therein is depicted an exploded view of the essential parts of a bubble cap assembly 10 constructed in accordance with the present invention. Bubble cap assembly 10 comprises a riser 12, a bubble cap 14, spacer means 16, a retainer member 18 and lock means 20.

Figure 2:
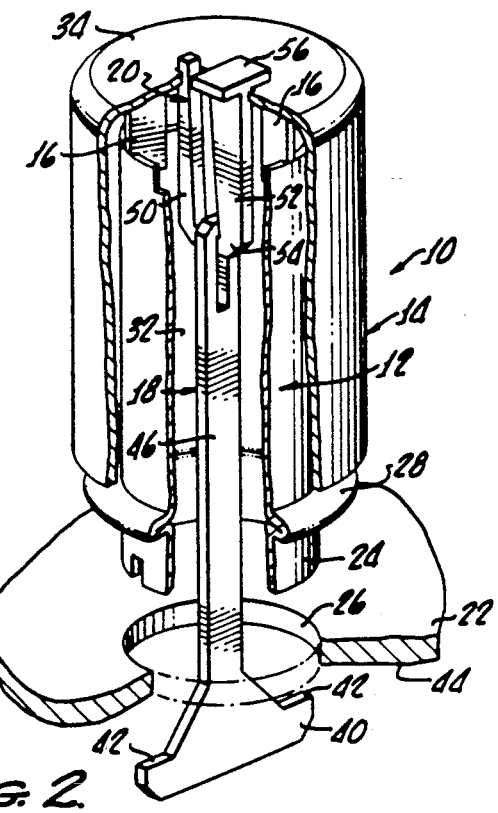
FIG. 2 is a perspective view partially broken away to show the manner in which the bubble cap assembly is installed or removed.
Figure 3:
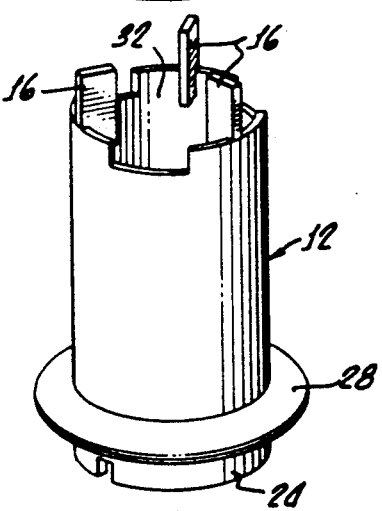
FIG. 3 is a cross-sectional elevation view of the bubble cap assembly of FIG. 1.
Figure 3:
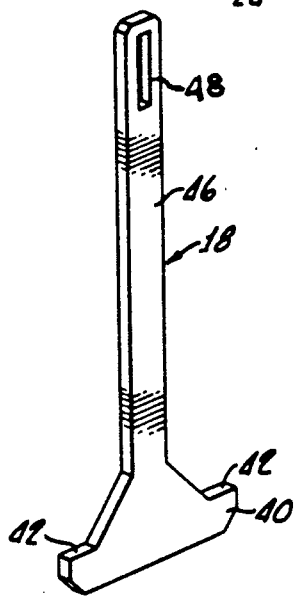
Figure 3:
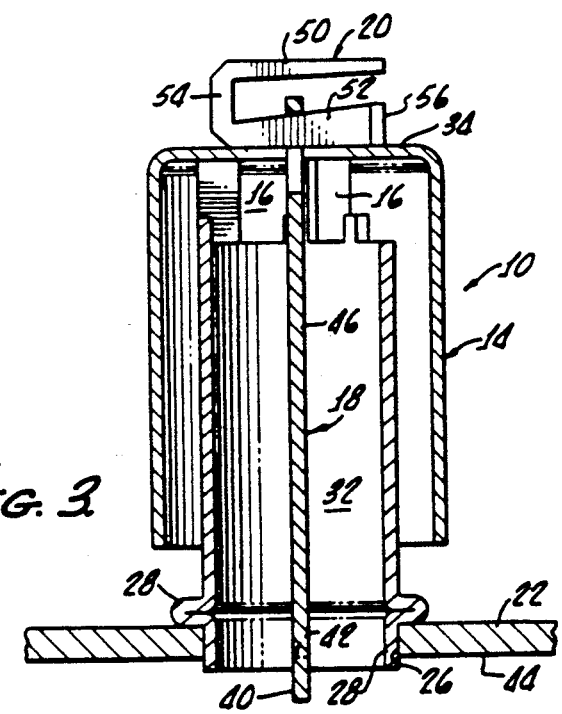

The manner in which the various elements of the bubble cap assembly cooperatively interact will be more apparent by reference to FIGS. 1-3. Riser 12, which is generally cylindrical in form, preferably is provided with a lower lip or extension 24 which is received within an opening 26 in a deck tray 22. Riser 12 may be cut from a length of tubular material or may be rolled from a length of sheet stock as desired. Riser 12 also includes a flange portion 28 adjacent its lower end which supports the riser on an upper surface 30 of the deck plate 22. As depicted flange 28 is formed as an integral part of riser 12. Alternatively, the flange could be in the form of a separate ring attached to the riser by press fit, shrink fit, welding or any other manner. Riser 12 has an inner passageway 32 which provides substantially the sole means of fluid communication across deck tray 22 through opening 26.

Bubble cap 14 encompasses an upper end of riser 12. Bubble cap 14 comprises a top wall 34 terminating about its periphery in a downwardly extending skirt 36 which terminates adjacent upper surface 30 of deck tray 22. Frequently, skirt 36 will have a plurality of slots or openings (not shown) for the passage of fluid therethrough. Bubble cap 14 further includes a substantially centrally located aperture 38 located in top wall 34. Aperture 38 comprises two rectangular openings superimposed upon and at substantially right angles to one another forming an opening in the shape of a cross, that is the central points of the two rectangular openings are coincident and preferably are on the axis of bubble cap 14. Typically, one of the rectangular openings is larger than the other, i.e., one has a larger length than the other opening. The function of these two openings will be described later.

Means are provided for maintaining bubble cap 14 and riser 12 in a spaced apart relationship with one another substantially as depicted. As shown in the drawing, this means comprises a plurality of spacers 16 which typically will be fastened to the cap, riser or both. Top wall 34 of cap 14 rests on spacers 16. Spacers 16 also extend radially outwardly and maintain bubble cap 14 substantially centered with respect to riser 12.

Means are provided for securing bubble cap assembly 10 in position on deck tray 22 in communication with opening 26. As shown in the drawings, this means includes retainer member 18 and lock means 20. Retainer member 18 is disposed within inner passageway 32. A lower end of retainer member 18 is provided with oppositely extending projections 40. Each of projections 40 is provided with an upwardly extending face portion 42 for engagement with a bottom surface 44 of deck tray 22. If the lower lip 34 of riser 12 extends below surface 44 of deck tray 22, it may be necessary to provide a notch 25 (FIG. 1) in lower lip 24 to ensure that face 42 of retainer member 18 engages bottom surface 44 of deck 22. Alternatively, a notch (not shown) could be provided in face 42 to accommodate lower lip 24. Retainer member 18 further includes an upwardly extending stem portion 46 which is received through the smaller of the two rectangular openings forming aperture 38 in bubble cap 14. Retainer member 18 is provided with a vertical slot 48 for receiving therethrough a substantial portion of lock means 20.

A key aspect for the present invention is the configuration of lock means 20. Referring now particularly to FIG. 2 it is seen that locking means comprises two substantially parallel leg members 50 and 52 which are connected at one end by a base member 54. One of the leg members, for example, leg member 52, is in the form of a ramp to provide a wedge means for engagement with the slot in retainer member 18 which extends through top wall 34 of bubble cap 14. Leg members 50 and 52 and base member 54 are sized for passage through the larger of the two rectangular openings forming aperture 38 in bubble cap 14. To prevent locking means 20 from passing entirely through aperture 38, leg member 52 is provided with an end piece 56 which is sized to prevent passage of locking means 20 through aperture 38 during installation and removal of the bubble cap assembly. As depicted, end piece 56 is welded or otherwise attached to the end of leg member 52. It will be apparent, however, that it could also be an integral part of leg member 52, for example, by bending the end of leg member 52 to form a comparable end portion.

Referring now to FIG. 3 which depicts locking means 20 installed in bubble cap assembly 10 for normal operation, the ramp portion of leg member 52 engages slot 48 in retaining member 18 and presses against top wall 34 of bubble cap 14. The ramp portion acts as a wedge for tightly urging bubble cap 14, spacer means 16 and riser 12 against upper surface 30 of deck tray 22 and concurrently urging faces 42 of retainer member 18 against lower surface 44 of deck tray 22.

Figure 4:
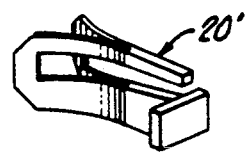
FIG. 4 is a perspective view of a modified locking means.

Referring specifically to FIG. 4, therein is depicted an alternative embodiment of the locking means of the present invention. The alternate form of locking means 20, designated 20′, is substantially the same as that hereinbefore described, with one exception: locking means 20′ is formed from two layers of a deformable material, typically a steel or steel alloy which will permit deformation of the leg members without fracture. After locking means 20′ is installed, the layers are spread apart as depicted and will act in the nature of a lock washer to prevent disassembly of the parts upon vibration, such as might occur during shipment.

During installation of bubble cap assembly 10, locking means 20 occupies the position shown in FIG. 3. Retainer member 18 is suspended at its lowest position with respect to bubble cap 14 by locking means 20. The lower end portion 40 of retainer member 18 is inclined and inserted through opening 26 of deck tray 22. After the lower end 24 of the riser 12 is placed within opening 26, retainer member 18 is raised and bubble cap assembly 10 clamped in position by driving the wedge portion of locking means 20 into slot 48 to the position shown in FIG. 2. A readily understood reversal of these steps will permit disassembly from the upper side only of the deck for cleaning or replacement.

From the foregoing description, it will be readily apparent that the operation of removing and replacing the bubble cap assembly of the present invention may be accomplished entirely from an upper surface of the particular deck tray involved and it is unnecessary to insert or fasten a portion of the assembly from an underside of the deck tray. Thus, a single workman on the upward side of the tray can remove and replace the bubble cap assembly without assistance from below. It also will be apparent that the removal or installation of the bubble cap assembly requires no special tools other than a hammer or a mallet for the removal or securing of lock means 20. Another advantage of the invention is that there are no loose parts which might drop through the opening in the deck tray during installation or removal of the bubble cap assembly.

Having fully described the invention and what is now considered to be its best mode, it is not to be limited to the details hereinabove set forth; rather, it should be interpreted in accordance with the spirit and scope of the appended claims.

What is claimed is:

1. A bubble cap assembly comprising: a conduit defining a passageway for fluids, said conduit having an entry opening to the passageway and an exit opening from the passageway;
   a bubble cap located over the exit passageway of the conduit, said bubble cap having a top portion, a downwardly extending skirt portion, and an opening located in the top portion; said opening being formed by two rectangular slots, one being super imposed upon and at substantially right angles to the other forming a cross;
   spacer means for maintaining a gap between the exit opening of the conduit and the bubble cap;
   a retainer member disposed within the passageway in the conduit and having (1) a lower end portion comprising an outwardly projecting end portion and (2) a stem which is attached to said lower end portion, extends upwardly through the opening in the bubble cap, and has a slot in the upper portion of the stem, which extends above the bubble cap; and
   locking means for tightly urging the bubble cap, spacer means and conduit in one direction and simultaneously urging the lower end portion of the retainer member in the opposite direction, said locking means extending through the slot above the bubble cap.

2. A bubble cap assembly as defined in claim 1 wherein the outwardly projecting end portion of said retainer member is of such a size and shape as to prevent its passing through said conduit.

3. A bubble cap assembly as defined in claim 1 wherein the passageway in said conduit is of essentially symmetrical cross-section and wherein the two outwardly projecting end portions emanate from substantially the center of said cross-section and project in opposite directions beyond the edge of the conduit.

4. The assembly of claim 1 wherein one of the rectangular openings forming the cross is shorter than the other, the shorter one being formed for receiving the stem portion of the retainer member and the other one being formed for the passage therethrough of the leg portions and base portion of the locking means.

5. A bubble cap assembly as defined in claim 1 wherein said locking means comprises two leg members joined at one end by a base portion, one of the leg members extending through the slotted opening in the stem of the retainer member above the bubble cap 6. A bubble cap assembly as defined in claim 5 wherein the conduit is essentially tubular and the passageway is of essentially circular cross-section and the two outwardly projecting end portions emanate from substantially the center of said cross section and project diametrically beyond the edge of the conduit.

7. A bubble cap assembly as defined in claim 5 wherein at least one of said leg members is wedge-shaped.

8. A bubble cap assembly as defined in claim 7 wherein said retainer member is comprised of two outwardly projecting end portions, each of which projects beyond an edge of said conduit.

9. A bubble cap assembly for attachment to a deck tray having an opening therethrough comprising: a riser having an end for location over the opening, an opposite end and a fluid passageway extending therebetween;
   a bubble cap located over the opposite end of the riser, the bubble cap having a top portion, a downwardly extending skirt portion and an opening located in the top portion;
   spacer means located intermediate the riser and bubble cap for maintaining a fluid flow path therebetween;
   a retainer member disposed within the passageway in the riser and having (1) a lower end portion comprising outwardly extending end portions for engaging a lower surface of the deck tray, (2) a stem portion connected to the lower end portion and extending upwardly through the opening in the bubble cap and (3) a slotted opening adjacent an upper end of the stem portion; and
   locking means comprising two leg portions joined at one end by a base portion, said leg portions and said base portion being sized for passage through the opening in the top of the bubble cap for lowering the outwardly extending end portions of the retainer member below the riser during installation and removal of the bubble cap assembly, one of the leg portions extending through the slot in the shaft portion of the retainer member and comprising a means for urging the bubble cap, spacer means and riser, and the lower end portion of the retainer member together.

10. The assembly of claim 9 further comprising means for preventing the retainer member from falling through the opening in the top of the bubble cap.

11. The assembly of claim 9 wherein the leg portion in the form of a wedge terminates in an end piece having a dimension greater than that of the opening in the top of the bubble cap.

12. The assembly of claim 9 wherein the locking means is formed from two face to face layers of a deformable material affixed to one another adjacent an end of the leg portions opposite the base portion.

13. A bubble cap assembly for a deck tray having a substantially cylindrical opening therethrough comprising:
   a tubular riser for location above the opening;
   a bubble cap encompassing the upper end of the riser and having a central opening therethrough;
   spacer means for maintaining the bubble cap and riser in a spaced apart relationship with one another;
   a retainer member extending through the riser having an outturned lower end portion extending over a lower surface of the deck tray and an upwardly extending stem portion projecting through the opening in the bubble cap, the stem portion having a slotted opening adjacent an upper end thereof; and
   locking means for the removable installation of the bubble cap assembly, the locking means comprising two substantially parallel leg portions joined at one end by a base portion and sized for passage through the opening in the bubble cap, one of the leg portions forming a wedge means for partial passage through the slot in the retaining member for tightly engaging the top of the bubble cap to urge the cap towards the lower end of the riser and urge the out turned lower end portion of the retaining member against the lower surface of the deck tray.

14. The assembly of claim 13 wherein the riser terminates at its lower end in a portion sized to enter the opening in the deck tray for providing substantially the sole means of fluid communication through the opening.

15. The assembly of claim 13 wherein the leg portion forming the wedge means terminates at an opposite end in an end piece for preventing the locking means from passing through the opening in the bubble cap.

16. The assembly of claim 15 wherein the retainer member has a substantially rectangular cross section.

17. The assembly of claim 16 wherein the locking means has a substantially rectangular cross section.

18. The assembly of claim 17 wherein the opening in the cap comprises two substantially rectangular openings superimposed upon and at substantially right angles to one another to form a cross.

19. The assembly of claim 18 wherein one of the rectangular openings in the cap is larger than the stem portion of the retainer member for the passage therethrough of the stem portion.

20. The assembly of claim 19 wherein the other rectangular opening in the cap is larger than the leg and base portions of the locking means for the passage therethrough of said portions.

21. The assembly of claim 20 wherein the riser is provided with an outwardly projecting portion adjacent its lower end for supporting the riser on an upper surface of the deck tray.

22. An apparatus comprising
(1) a substantially horizontal deck tray with at least one opening therein;
(2) a means for directing a fluid upwardly from said opening;
(3) a bubble cap for receiving and re-directing the fluid downwardly onto the upper surface of the deck tray, said bubble cap having an opening therein, said opening comprising two substantially rectangular slots superimposed upon one another to form a cross;
(4) means for spacing said bubble cap apart from said means (2);
(5) a retainer member having (a) an upper portion with an aperture extending through said bubble cap and, said means (2), and (b) a lower portion beneath said deck tray, said lower portion having a means for contacting the lower surface of said deck tray in response to an upward force on said retainer member, and
(6) a locking means engaged within said aperture in said upper portion of said retainer member and having means for simultaneously inducing a downwardly directed force on said bubble cap and an upwardly directed force on said retainer member.

23. The apparatus of claim 22 wherein the locking means comprises a leg portion forming a wedge means which terminates at an end in an end piece for preventing the locking means from passing through the opening in the bubble cap.

24. The apparatus of claim 23 wherein the retainer member has a substantially rectangular cross section.

25. The apparatus of claim 24 wherein the locking means has a substantially rectangular cross section.

26. The apparatus of claim 25 wherein one of the rectangular openings in the cap is larger than the upper portion of the retainer member for the passage therethrough of the upper portion.

27. The apparatus of claim 26 wherein the other rectangular opening in the cap is larger than the leg and base portions of the locking means for the passage therethrough of said portions.

28. The apparatus of claim 27 wherein said means (2) comprises a riser which is provided with an outwardly projecting portion adjacent its lower end for supporting the riser on an upper surface of the deck tray.

* * * * *